United States Patent Office 3,644,361
Patented Feb. 22, 1972

3,644,361
PHTHALAZINES
Elvio Bellasio, Albate, Italy, Emilio Testa, Ticino, Switzerland, and Giulio Maffii, Milan, Italy, assignors to Gruppo Lepetit S.p.A., Milan, Italy
No Drawing. Filed June 9, 1969, Ser. No. 831,707
Claims priority, application Italy, June 12, 1968, 17,703/68
Int. Cl. C07d 51/06
U.S. Cl. 260—250                  24 Claims

ABSTRACT OF THE DISCLOSURE

Novel 3,4-dihydro-1-alkoxyphthalazines are prepared by the reaction of the corresponding 3,4-dihydro-1(2H)-phthalazinones with a trialkyloxonium fluoborate. The novel compounds are useful sedative hypnotic and anticonvulsant agents.

---

This invention is concerned with a new class of compounds and with a method for preparing them. More particularly the compounds are derivatives of phthalazine represented by the following formula

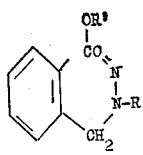

wherein R is a member of the class consisting of hydrogen and acyl, such as, for example, acetyl, phenylacetyl, p - isobutylphenylacetyl, p - ethoxyphenylacetyl, p-chlorophenylacetyl, 2 - dibenzofuranylacetyl, diphenylacetyl, α-fluorophenylacetyl, propionyl, bromopropionyl, butyryl, caproyl, valeryl, benzoyl, p - chlorobenzoyl, p - nitrobenzoyl, 3,4,5 - trimethoxybenzoyl, cinnamoyl, mandeloyl and tropoyl, and R' is alkyl, for example, methyl, ethyl and propyl.

The process for preparing the new class of compounds comprises contacting and reacting a compound of the formula

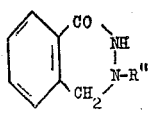

wherein R" is acyl as above defined with an overequimolecular amount of trialkyloxonium fluoborate, in an anhydrous inert solvent and, if desired, hydrolyzing the 3-acyl-1-alkoxyphthalazine obtained to the corresponding 3-unsubstituted derivative.

The acyl group at position 3 is split off according to known procedures using for instance an alkali metal hydroxide or hydrazine as the hydrolyzing agent.

The preparation of compound II may be carried out starting from 1(2H) - phthalazinone, which by catalytic hydrogenation is glacial acetic acid in the presence of platinum dioxide is converted into the 3-acetyl-3,4-dihydro - 1(2H) - phthalazinone. By heating this compound with hydrochloric acid, the acetyl radical is split off and the 3,4-dihydro-1(2H) - phthalazinone is formed, which can be acylated at position 3 according to conventional procedures, such as the use of acyl chlorides, to give the starting compounds II of the invention.

While the preparation for some compounds of the invention is reported later on in detail by means of the examples, we mention in the following further materials falling within the scope of the present application, which may be prepared usefully according to the method herein described.

3-butyryl-3,4-dihydro-1-methoxyphthalazine
3,4-dihydro-1-methoxy-3-valerylphthalazine
3-caproyl-3,4-dihydro-1-methoxyphthalazine
3-(3-bromopropionyl)-3,4-dihydro-1-methoxyphthalazine
3-cinnamoyl-3,4-dihydro-1-methoxyphthalazine
3,4-dihydro-1-methoxy-3-p-nitrobenzoylphthalazine
3,4-dihydro-1-methoxy-3-phenylacetylphthalazine
3,4-dihydro-3-(p-isobutylphenylacetyl)-1-methoxyphthalazine
3,4-dihydro-3-(p-ethoxyphenylacetyl)-1-methoxyphthalazine
3-(p-chlorophenylacetyl)-3,4-dihydro-1-methoxyphthalazine
3-(2-dibenzofuranylacetyl)-3,4-dihydro-1-methoxyphathalazine
3,4-dihydro-3-diphenylacetyl-1-methoxyphthalazine
3,4-dihydro-3-(α-fluorophenylacetyl)-1-methoxyphthalazine
3,4-dihydro-3-mandeloyl-1-methoxythalazine
3,4-dihydro-1-methoxy-3-tropoylphthalazine Still other representative compounds of this class are for instance the phthalazines listed above, containing an ethoxy or propoxy radical at position 1, or a methoxy group.

The compounds of the invention display a high depressant action on the central nervous system as sedative, hypnotic and anticonvulsant reagents. Their sedative and hypnotic effectiveness was evalutated by observing the diminution of motility and curiosity and the decrease of spontaneous activity in mice according to Irwin S.—Gordon Res. Conf. Med. Chem.—New London (N.H., 3/7–8,133 (1959) and Psychopharmacologie (Berl.), 13,222 (1968). For instance the $ED_{50}$ of 3-acetyl-3,4-dihydro-1-ethoxyphthalazine and 3 - acetyl - 3,4-dihydro-1-methoxyphthalazine were found respectively 30 and 40 mg./kg. i.p. with a toxicity ($LD_{50}$) respectively of 700 and 500 mg./kg. i.p. These results may be favourably compared with or a well known marketed drug displaying the same type of activity.

Phenobarbital for instance, tested under the same conditions showed a $ED_{50}$–60 mg./kg., i.p., and a $LD_{50}$ remarkedly higher, namely 300 mg./kg. i.p. Satisfactory results were likewise observed in the abolition of the righting reflex in rats, still according to Irwin. The data, for some respresentatives of the class are listed in Table 1.

TABLE 1

| Compound of Example— | $ED_{50}$ I.P., mg./kg. | $LD_{50}$ I.P., mg./kg. |
|---|---|---|
| 1 | 20 | 700 |
| 7 | 30 | 500 |
| 8 | 30 | 500 |
| Barbital | 50 | 500 |

The novel phthalazines have been found particularly useful in the study of the behaviour of the animals after administration of these drugs, and in ascertaining the effect produced by them on the central nervous system. Moreover the low toxicity of the novel phthalazines makes them entirely safe for clinical purposes.

They may be administered alone or incorporated into pharmaceutical compositions such as tablets, capsules, suspensions and other like dosage forms for oral administration, and solutions, suspensions and other dosage forms for parenteral administration at doses ranging from 0.025 g. to 1 g. pro dosi.

The following non-limitative examples illustrate the invention.

EXAMPLE 1

3-acetyl-3,4-dihydro-1-ethoxyphthalazine

To a solution of 144.5 g. of triethyloxonium fluoborate in 600 ml. of methylene chloride, 36.1 g. of 3-acetyl-3,4-dihydro-1(2H)-phthalazinone, dissolved in 550 ml. of the same solvent are added at room temperature. The solution is stirred for 4 hours, then is allowed to stand overnight. Then 1,600 ml. of aqueous saturated sodium carbonate are added and the mixture is vigorously stirred 3 hours. The organic phase is separated, made anhydrous and concentrated to dryness in vacuo. The oily residue is chromatographed on a column, formed by 430 g. of silicagel and filled with benzene and the elution is carried out with a mixture of benzene/acetone (8/2). Portions of eluate, consisting each of 50 ml., are collected and evaporated to dryness, until a solid residue is formed in them. From this moment 500 ml. of eluate are collected and evaporated to dryness in vacuo. The residue (28 g.) is crystallized from petroleum ether. An amount of 22 g. of 3-acetyl-3,4-dihydro-1-ethoxyphthalazine is obtained; M.P. 70–72° C.

*Analysis.*—Calculated for $C_{12}H_{14}N_2O_2$ (percent): C, 66.03; H, 6.47; N, 12.84. Found (percent): C, 65.85; H, 6.79; N, 12.90.

EXAMPLE 2

3,4-dihydro-1-ethoxy-3-propionylphthalazine

To 40 g. of triethyloxonium fluoborate, dissolved in 150 ml. of methylene chloride a solution of 10 g. of 3,4-dihydro-3-propionyl-1(2H)-phthalazinone in 150 ml. of methylene chloride are added at room temperature. The mixture is stirred during 4 hours, then allowed to stand overnight. After addition of 5.30 ml. of aqueous saturated sodium carbonate, the liquid is vigorously shaken for 3 hours. The organic phase is separated and concentrated to dryness in vacuo. The residue is first purified by chromatographic route, as described in Example 1, then crystallized from petroleum ether. Yield 4.4 g. of 3,4-dihydro-1-ethoxy-3-propionylphthalazine; M.P. 65–67° C.

*Analysis.*—Calculated for $C_{13}H_{16}N_2O_2$ (percent): C, 67.22; H, 6.94; N, 12.06. Found (percent): C, 67.00; H, 7.20; N, 12.25.

EXAMPLE 3

3-benzoyl-3,4-dihydro-1-ethoxyphthalazine

Two solutions respectively of 70 g. of triethyloxonium fluoborate in 270 ml. of methylene chloride and of 18.2 g. of 3-benzoyl-3,4-dihydro-1(2H)-phthalazinone are mixed together at room temperature, stirred for 4 hours and allowed to stand overnight. Then 960 ml. of an aqueous saturated sodium carbonate solution are added and the liquid strongly agitated for 3 hours. The organic phase is separated, the solvent distilled off in vacuo, and the residue chromatographed as said in Example 1. The residue obtained from the eluate, is crystallized from ethyl acetate, to give 13.1 g. of 3-benzoyl-3,4-dihydro-1-ethoxyphthalazine; M.P. 136.5–138° C.

*Analysis.*—Calculated for $C_{17}H_{16}N_2O_2$ (percent): C, 72.84; H, 5.75; N, 9.99. Found (percent): C, 73.21; H, 5.83; N, 10.12.

EXAMPLE 4

3-p-chlorobenzoyl-3,4-dihydro-1-ethoxyphthalazine

It is prepared from 48 g. of triethyloxonium fluoborate and 12.2 g. of 3-p-chlorobenzoyl-3,4-dihydro-1(2H)-phthalazinone substantially according to the method described in Example 1. Yield 7.0 g.; M.P. 108–110° C.

*Analysis.*—Calculated for $C_{17}H_{15}N_2O_2Cl$ (percent): C, 64.84; H, 4.80; N, 8.90; Cl, 11.26. Found (percent): C, 64.70; H, 4.75; N, 8.68; Cl, 11.18.

EXAMPLE 5

3,4-dihydro-1-ethoxy-3-(3,4,5-trimethoxy-benzoyl)-phthalazine

It is prepared from 51 g. of triethyloxonium fluoborate and 13.0 g. of 3,4-dihydro-3-(3,4,5-trimethoxybenzoyl)-1(2H)-phthalazinone, substantially according to the same method, described in Example 1. Yield 9.4 g.; M.P. 137–138° C.

*Analysis.*—Calculated for $C_{20}H_{22}N_2O_5$ (percent): C, 64.85; H, 5.99; N, 7.56. Found (percent): C, 64.71; H, 6.13; N, 7.65.

EXAMPLE 6

3,4-dihydro-1-ethoxyphthalazine (A) An amount of 1 g. of 3-acetyl-3,4-dihydro-1-ethoxyphthalazine is dissolved in a mixture of 20 ml. of a 10% aqueous solution of sodium hydroxide and 20 ml. of ethanol. The solution is refluxed for 30 minutes, then the solvent is removed to dryness in vacuo. The residue is taken up with water and extracted with diethyl ether. The organic phase is made anhydrous, and concentrated to dryness. A residue is obtained, which is distilled in vacuo at 0.2 mm. Hg. The fractions boiling at 110° C. are collected, to afford 0.6 g. of 3,4-dihydro-1-ethoxyphthalazine.

The free base can be converted into the corresponding hydrochloride, by dissolving it in diethyl ether and contacting with a solution of hydrogen chloride in the same solvent. M.P. of the 3,4-dihydro-1-ethoxyphthalazine hydrochloride 166–168° C.

*Analysis.*—Calculated for $C_{10}H_{13}ClN_2O$ (percent): C, 56.45; H, 6.16; N, 13.17; Cl. 16.66. Found (percent): C, 56.55; H, 6.28; N, 12.93; Cl, 14.47.

(B) A solution of 15.2 g. of 3-acetyl-3,4-dihydro-1-ethoxyphthalazine in 100 ml. of anhydrous hydrazine are refluxed for 2 hours. The mixture is then concentrated to dryness in vacuo, the residue is taken up with water, and extracted before with diethylether, then with chloroform. The combined organic extracts, are washed with water, made anhydrous with sodium sulphate and concentrated to dryness. An oily residue is obtained which is dissolved in isopropanol and contacted with a hydrogen chloride solution in diethyl ether. By adding an excess of diethyl ether, the 3,4-dihydro-1-ethoxyphthalazine hydrochloride precipitates, which is collected and recrystallized from ethanol. Yield 12.4 g.; M.P. 166.5–168° C.

EXAMPLE 7

3-acetyl-3,4-dihydro-1-methoxyphthalazine

Prepared substantially according to the method described in Example 1, from 32.4 g. of trimethyloxonium fluoborate and 21.45 g. of 3-acetyl-3,4-dihydro-1(2H)-phthalazinone. Yield 17.3 g.; M.P. 63–65° C.

*Analysis.*—Calculated for $C_{11}H_{12}N_2O_2$ (percent): C, 64.69; H, 5.43; N, 13.71. Found (percent): C. 64.75; H, 5.49; N, 13.80.

EXAMPLE 8

3-propionyl-3,4-dihydro-1-methoxyphthalazine

Prepared substantially according to the method described in Example 1, from 32.4 g. of trimethyloxonium fluoborate and 21.45 g. of 3-propionyl-3,4-dihydro-1(2H)-phthalazinone. Yield 18.4 g.; B.P. 120° C./0.2 mm. Hg.

*Analysis.*—Calculated for $C_{12}H_{14}N_2O_2$ (percent): C, 66.01; H, 6.46; N, 12.84. Found (percent): C, 66.54; H, 6.38; N, 13.20.

EXAMPLE 9

3-benzoyl-3,4-dihydro-1-methoxyphthalazine

Prepared substantially according to the method described in Example 1, from 20.25 g. of trimethyloxonium fluoborate and 6.5 g. of 3-benzoyl-3,4-dihydro-1(2H)-phthalazinone. Yield 4.88 g.; M.P. 106–108° C.

*Analysis.*—Calculated for $C_{16}H_{14}N_2O_2$ (percent): C, 72.16; H, 5.30; N, 10.52. Found (percent): C, 72.22; H, 5.38; N, 10.65.

EXAMPLE 10

3-p-chlorobenzoyl-3,4-dihydro-1-methoxyphthalazine

Prepared substantially as described in Example 1, starting from 32.4 g. of trimethyloxonium fluoborate and 21.45 g. of 3-p-chlorobenzoyl - 3,4 - dihydro-1-(2H)-phthalazinone. Yield 15.5 g.; M.P. 126–128° C.

*Analysis.*—Calculated for $C_{16}H_{13}ClN_2O_2$ (percent): C, 63.92; H, 4.36; Cl, 11.79; N, 9.31. Found (percent): C, 63.60; H, 4.29; Cl, 11.85; N, 9.44.

EXAMPLE 11

3-(3,4,5-trimethoxybenzoyl)-3,4-dihydro-1-methoxyphthalazine

Prepared substantially as described in Example 1, starting from 32.4 g. of trimethyloxonium fluoborate and 21.45 g. of 3-(3,4,5-trimethoxybenzoyl)-3,4-dihydro-1-(2H)-phthalazinone. Yield 16.3 g.; M.P. 124–126° C.

*Analysis.*—Calculated for $C_{19}H_{20}N_2O_5$ (percent): C, 64.03; H, 5.66; N, 7.86. Found (percent): C, 63.85; H, 5.75; N, 7.95.

We claim:

1. A process for preparing a phthalazine of the formula

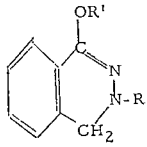

wherein R is a member of the class consisting of hydrogen and acyl, the acyl group being a member of the class consisting of acetyl, phenylacetyl, p-isobutylphenylacetyl, p-ethoxyphenylacetyl, p-chlorophenylacetyl, 2-dibenzofuranylacetyl, diphenylacetyl, α-fluorophenylacetyl, propionyl, bromopropionyl, butyryl, caproyl, valeryl, benzoyl, p-chlorobenzoyl, p-nitrobenzoyl, 3,4,5-trimethoxybenzoyl, cinnamoyl, mandeloyl and tropoyl, and R' is methyl, ethyl or propyl, which comprises contacting and reacting a compound of the formula

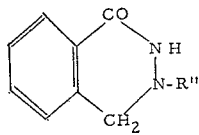

wherein R" is acyl as above defined, with an overequimolecular amount of trialkyoxonium fluoborate, the alkyl group being methyl, ethyl or propyl, in an anhydrous inert solvent and, if desired, hydrolyzing the 3-acyl-1-alkoxyphthalazine obtained to the corresponding 3-unsubstituted derivatives by means of alkali metal hydroxide or hydrazine.

2. A process as in claim 1, wherein the phthalazine is 3-acetyl-3,4-dihydro-1-ethoxyphthalazine.

3. A process as in claim 1, wherein the phthalazine is 3,4-dihydro-1-ethoxy-3-propionylphthalazine.

4. A process as in claim 1, wherein the phthalazine is 3-benzoyl-3,4-dihydro-1-ethoxyphthalazine.

5. A process as in claim 1, wherein the phthalazine is 3-p-chlorobenzoyl-3,4-dihydro-1-ethoxyphthalazine.

6. A process as in claim 1, wherein the phthalazine is 3,4 - dihydro - 1 - ethoxy-3-(3,4,5-trimethoxybenzoyl)-phthalazine.

7. A process as in claim 1, wherein the phthalazine is 3,4-dihydro-1-ethoxyphthalazine.

8. A process as in claim 1, wherein the phthalazine is 3-acetyl-3,4-dihydro-1-methoxyphthalazine.

9. A process as in claim 1, wherein the phthalazine is 3-propionyl-3,4-dihydro-1-methoxyphthalazine.

10. A process as in claim 1, wherein the phthalazine is 3-benzoyl-3,4-dihydro-1-methoxyphthalazine.

11. A process as in claim 1, wherein the phthalazine is 3-p-chlorobenzoyl-3,4-dihydro-1-methoxyphthalazine.

12. A process as in claim 1, wherein the phthalazine is 3-(3,4,5-trimethoxybenzoyl)-3,4-dihydro - 1 - methoxyphthalazine.

13. A compound of the formula

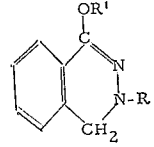

wherein R is a member of the class consisting of hydrogen and acyl, the acyl group being a member of the class consisting of acetyl, phenylacetyl, p-isobutylphenylacetyl, p-ethoxyphenylacetyl, p-chlorophenylacetyl, 2-dibenzofuranylacetyl, diphenylacetyl, α-fluorophenylacetyl, propionyl, bromopropionyl, butyryl, caproyl, valeryl, benzoyl, p-chlorobenzoyl, p-nitrobenzoyl, 3,4,5-trimethoxybenzoyl, cinnamoyl, mandeloyl and tropoyl, and R' is methyl, ethyl or propyl.

14. A compound as in claim 13, wherein the compound is 3-acetyl-3,4-dihydro-1-ethoxyphthalazine.

15. A compound as in claim 13, wherein the compound is 3,4-dihydro-1-ethoxy-3-propionylphthalazine.

16. A compound as in claim 13, wherein the compound is 3-benzoyl-3,4-dihydro-1-ethoxyphthalazine.

17. A compound as in claim 13, wherein the compound is 3-p-chlorobenzoyl-3,4-dihydro-1-ethoxyphthalazine.

18. A compound as in claim 13, wherein the compound is 3,4-dihydro - 1 - ethoxy-3-(3,4,5-trimethoxybenzoyl)-phthalazine.

19. A compound as in claim 13, wherein the compound is 3,4-dihydro-1-ethoxyphthalazine.

20. A compound as in claim 13, wherein the compound is 3-acetyl-3,4-dihydro-1-methoxyphthalazine.

21. A compound as in claim 13, wherein the compound is 3-propionyl-3,4-dihydro-1-methoxyphthalazine.

22. A compound as in claim 13, wherein the compound is 3-benzoyl-3,4-dihydro-1-methoxyphthalazine.

23. A compound as in claim 13, wherein the compound is 3-p-chlorobenzoyl-3,4-dihydro-1-methoxyphthalazine.

24. A compound as in claim 13, wherein the compound is 3-(3,4,5 - trimethoxybenzoyl)-3,4-dihydro-1-methoxyphthalazine.

References Cited

Chemical Abstracts, vol. 62, p. 2782 (1965).
Chemical Abstracts, vol. 60, pp. 14516–14517 (1964).

NICHOLAS S. RIZZO, Primary Examiner

U.S. Cl. X.R.

424—250